United States Patent
Ogawa

(10) Patent No.: US 11,834,638 B2
(45) Date of Patent: *Dec. 5, 2023

(54) CONDUCTIVE AQUEOUS SOLUTION PRODUCTION DEVICE AND CONDUCTIVE AQUEOUS SOLUTION PRODUCTION METHOD

(71) Applicant: KURITA WATER INDUSTRIES LTD., Tokyo (JP)

(72) Inventor: Yuuichi Ogawa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 545 days.

This patent is subject to a terminal disclaimer.

(21) Appl. No.: 16/485,091

(22) PCT Filed: Mar. 9, 2017

(86) PCT No.: PCT/JP2017/009430
§ 371 (c)(1),
(2) Date: Aug. 9, 2019

(87) PCT Pub. No.: WO2018/146823
PCT Pub. Date: Aug. 16, 2018

(65) Prior Publication Data
US 2020/0040285 A1    Feb. 6, 2020

(30) Foreign Application Priority Data
Feb. 9, 2017 (JP) .................... 2017-022494

(51) Int. Cl.
*C11D 7/04* (2006.01)
*C11D 7/50* (2006.01)
(Continued)

(52) U.S. Cl.
CPC ............ *C11D 7/04* (2013.01); *C02F 1/42* (2013.01); *C02F 1/685* (2013.01); *C11D 7/50* (2013.01);
(Continued)

(58) Field of Classification Search
CPC ......... C11D 7/04; C11D 7/50; C11D 11/0047; C11D 7/02; B08B 3/08; C02F 1/42;
(Continued)

(56) References Cited

U.S. PATENT DOCUMENTS 5,811,012 A * 9/1998 Tanabe .................. C02F 1/42
                                                    210/669
11,104,594 B2 * 8/2021 Ogawa ................. C02F 1/685
(Continued)

FOREIGN PATENT DOCUMENTS

JP    2010-234356 A    10/2010
JP    2011/194402 A    10/2011
(Continued)

OTHER PUBLICATIONS

JP 2016076589 A English description, May 2016, Sugawara Hiroshi et al.*
(Continued)

*Primary Examiner* — Akash K Varma
(74) *Attorney, Agent, or Firm* — MOSER TABOADA

(57) ABSTRACT

A conductive aqueous solution production device 1 has an ion exchange device 2 mounted on the way of the main pipe 11 supplying ultrapure water W as raw water, a supply pipe 12 which joins the main pipe 11 on the downstream side of the ion exchange device 2, and a conductivity-imparting substance supply device 3. For example, if the conductivity-imparting substance is ammonia, since the ions are cations, that is, ammonium ions ($NH_4^+$), it is preferable that an ion exchanger which fills the ion exchange device 2 be a cation
(Continued)

exchange resin. If the conductivity-imparting substance is carbon dioxide, the ions are anions, that is, bicarbonate ions ($HCO_3^-$) or carbonate ions ($CO_3^{2-}$), and therefore it is preferable that the ion exchange device 2 be filled with an anion exchange resin. Such a conductive aqueous solution production device is capable of producing a conductive aqueous solution with a stable concentration, and achieves excellent follow-up performance with respect to a change in concentration.

1 Claim, 6 Drawing Sheets

(51) Int. Cl.
*C11D 11/00* (2006.01)
*C02F 1/42* (2023.01)
*C02F 1/68* (2023.01)
*B08B 3/08* (2006.01)
*C02F 103/04* (2006.01)
*C02F 103/34* (2006.01)

(52) U.S. Cl.
CPC .............. *C11D 11/0047* (2013.01); *B08B 3/08* (2013.01); *C02F 2001/422* (2013.01); *C02F 2001/425* (2013.01); *C02F 2103/04* (2013.01); *C02F 2103/346* (2013.01)

(58) Field of Classification Search
CPC .............. C02F 1/685; C02F 2001/422; C02F 2001/425; C02F 2103/04; C02F 2103/346; C02F 1/68; C02F 1/686; C02F 9/00; C02F 9/005; C02F 2001/427; H01L 21/02052; H01L 21/304; B01F 1/00; B01F 5/26; B01J 39/00–26; B01D 61/48

USPC .................................. 134/1.3, 109; 210/681
See application file for complete search history.

(56) References Cited

U.S. PATENT DOCUMENTS

| 2007/0221581 | A1 | 9/2007 | Kitami et al. | |
| 2009/0165829 | A1* | 7/2009 | Morita | H01L 21/67057 134/115 R |
| 2016/0059273 | A1* | 3/2016 | Yano | H01L 21/02068 134/21 |

FOREIGN PATENT DOCUMENTS

| JP | 2013/255921 | A | | 12/2013 | | |
| JP | 2013-255921 | A | | 12/2013 | | |
| JP | 2016/076589 | A | | 5/2016 | | |
| JP | 2016-076589 | A | | 5/2016 | | |
| JP | 2016/076590 | A | | 5/2016 | | |
| JP | 2016-076590 | A | | 5/2016 | | |
| JP | 2016076589 | A | * | 5/2016 | ............ | B01D 61/00 |
| TW | 200538401 | A | | 12/2005 | | |
| TW | 200744763 | A | | 12/2007 | | |
| WO | WO-2007/105820 | A1 | | 9/2007 | | |
| WO | WO-2014178289 | A1 | * | 11/2014 | ............... | B08B 3/08 |

OTHER PUBLICATIONS

International Search Report for PCT/2017/009430 dated Apr. 11, 2017.

Office action for Chinese patent application No. 201780084670.8 dated Sep. 3, 2021, 8 pgs.

* cited by examiner

INLET SAMPLING    OUTLET SAMPLING

CONDUCTIVE AQUEOUS SOLUTION PRODUCTION DEVICE AND CONDUCTIVE AQUEOUS SOLUTION PRODUCTION METHOD

TECHNICAL FIELD

The present invention relates to a conductive aqueous solution production device and a conductive aqueous solution production method, and more particularly to a conductive aqueous solution production device and a conductive aqueous solution production method suitable for obtaining a high-purity conductive aqueous solution.

BACKGROUND ART

In semiconductor or liquid crystal production processes, semiconductor wafers or glass substrates are cleaned using ultrapure water from which impurities have been highly removed.

In the cleaning of a semiconductor wafer using such ultrapure water, static electricity is easily generated due to a high specific resistance value of ultrapure water, and may cause electrostatic breakdown of an insulating film and reattachment of fine particles. Therefore, nowadays, by dissolving a small amount of a conductivity-imparting substance, such as ammonia, in ultrapure water, the specific resistance value of the ultrapure water is adjusted to be low, and generation of static electricity is reduced.

A conductive aqueous solution which is obtained by dissolving a small amount of a conductivity-imparting substance in the ultrapure water is produced using a device that adds the conductivity-imparting substance to the ultrapure water, but since the conductive aqueous solution having a purity as high as possible is preferred, it is proposed to treat the conductive aqueous solution to which the conductivity-imparting substance is added, by an ion exchange device. (Patent Document 1, Patent Document 2).

PRIOR ART DOCUMENTS

Patent Documents

[Patent Document 1] JP2016-76590A
[Patent Document 2] JP2016-76589A

SUMMARY OF THE INVENTION

Problems to be Solved by the Invention

However, in the conductive aqueous solution production devices described in Patent Document 1 and Patent Document 2, after adding a conductivity-imparting substance to ultrapure water, the water is treated by an ion exchange device, and therefore, for example, in the case where ammonia is added as the conductivity-imparting substance and metal ions as impurities are to be removed from the resulting conductive aqueous solution, ammonium ions interfere with the removal of metal ions, which causes a problem of difficultly in sufficiently improving the purity. In particular, if the concentration of the conductive aqueous solution is high, the conductivity substance exchanges ions with an ion exchanger, and it is difficult to remove the substance desired to be removed. Moreover, when changing the concentration of the conductive aqueous solution, since the ion exchanger in the ion exchange device adsorbs or discharges ions, there is a problem of taking a long time for the conductive aqueous solution to be stable at a desired concentration.

The present invention has been made in view of the above problems, and it is an object of the present invention to provide a conductive aqueous solution production device and a conductive aqueous solution production method which are capable of producing a conductive aqueous solution with a stable concentration, and achieve excellent follow-up performance with respect to a change in concentration.

Means for Solving the Problems

In order to achieve the above object, firstly, the present invention provides a conductive aqueous solution production device comprising: an ion exchange device configured to circulate raw water; and a conductivity-imparting substance supply device for adding a conductivity-imparting substance to the raw water, which has passed through the ion exchange device, to generate a conductive aqueous solution, wherein if ions, which are generated by dissolving the conductivity-imparting substance in the raw water having passed through the ion exchange device and impart conductivity to the raw water, are cations, the ion exchange device is filled with a cation exchanger, whereas if the ions are anions, the ion exchange device is filled with an anion exchanger (Invention 1).

According to such an invention (Invention 1), when raw water such as ultrapure water is circulated in the ion exchange device, ions in the raw water are highly removed by an ion exchange reaction. At this time, if a desired conductive aqueous solution is cationic, for a source of cation to be added, other cations are an inhibiting factor, whereas if the desired conductive aqueous solution is anionic, for a source of anion to be added, other anions are an inhibiting factor, and therefore, by filling the ion exchange device with an ion exchanger that removes the corresponding ions and removing the ions, it is possible to stably obtain a conductive aqueous solution controlled highly accurately according to the conductivity-imparting substance to be added. Moreover, since the purity of the raw water is high (the corresponding anions or cations have been removed), the concentration of the conductive aqueous solution rapidly changes corresponding to the addition amount of the conductivity-imparting substance, thereby achieving excellent follow-up performance with respect to a change in the ion concentration caused by the conductivity-imparting substance.

In the above invention (Invention 1), it is preferable that a separation distance between an outlet of the ion exchange device and an addition point of the conductivity-imparting substance by the conductivity-imparting substance supply device is 5 m or less (Invention 2).

According to such an invention (Invention 2), by rapidly adding the conductivity-imparting substance to the raw water from which ions have been highly removed by the ion exchange device, it is possible to prevent dissolution of impurities and to obtain a conductive aqueous solution corresponding to the concentration of the conductivity-imparting substance to be added.

In the above invention (Inventions 1, 2), it is preferable that the conductivity-imparting substance be ammonia (Invention 3).

According to such an invention (invention 3), the conductive aqueous solution production device is suitable as a production device of cleaning water for a semiconductor wafer which requires a high-purity ammonia solution.

In the above invention (Invention 3), it is preferable that the ion exchange device be filled with a cation exchanger (Invention 4).

According to such an invention (Invention 4), since cations such as metal ions contained in the raw water are highly removed, the conductive aqueous solution production device is particularly suitable as a production device of cleaning water for a semiconductor wafer which requires a high-purity ammonia solution.

In the above invention (Inventions 3, 4), the raw water is preferably pure water or ultrapure water having a metal ion concentration of 10 ng/L or less (Invention 5).

According to such an invention (Invention 5), by treating the raw water by an ion exchange device to remove metal ions to a higher degree, it is possible to obtain a dilute ammonia solution with less metal ions, and it is further possible to grasp the concentration of the ammonia solution from the amount of ammonia added by the conductivity-imparting substance supply device.

In the above invention (Inventions 3 to 5), the metal ion concentration in the raw water after passing through the ion exchange device is preferably 10 ng/L or less (Invention 6).

According to such an invention (Invention 6), since a high-purity ammonia solution is provided, processes using the ammonia solution, such as cleaning of semiconductor wafers, can be suitably performed.

Secondly, the present invention provides a conductive aqueous solution production method comprising: an ion exchange step of bringing raw water into contact with an ion exchanger; and a step of adding a conductivity-imparting substance to the raw water, which has undergone an ion exchange treatment in the ion exchange step, to generate a conductive aqueous solution, wherein if ions, which are generated by dissolving the conductivity-imparting substance in the raw water that has undergone the ion exchange treatment and impart conductivity to the raw water, are cations, the raw water is brought into contact with a cation exchanger as the ion exchanger, whereas if the ions are anions, the raw water is brought into contact with an anion exchanger as the ion exchanger (Invention 7).

According to such an invention (Invention 7), when raw water such as ultrapure water is brought into contact with the ion exchanger, ions in the raw water are highly removed by an ion exchange reaction. At this time, if a desired conductive aqueous solution is cationic, for a source of cation to be added, other cations are an inhibiting factor, whereas if the desired conductive aqueous solution is anionic, for a source of anion to be added, other anions are an inhibiting factor, and therefore, by bringing the raw water into contact with an ion exchanger capable of removing the corresponding ions so as to remove the ions, it is possible to stably produce a high-purity conductive aqueous solution corresponding to the conductivity-imparting substance to be added. Moreover, since the purity of the raw water is high (the corresponding anions or cations have been removed), the concentration of the conductive aqueous solution rapidly changes corresponding to the addition amount of the conductivity-imparting substance, thereby achieving excellent follow-up performance with respect to a change in the ion concentration caused by the conductivity-imparting substance.

In the above invention (Invention 7), it is preferable that the conductivity-imparting substance be ammonia (Invention 8).

According to such an invention (Invention 8), the conductive aqueous solution production method is suitable as a production method of cleaning water for a semiconductor wafer which requires a high-purity ammonia solution.

In the above invention (Invention 8), it is preferable that the ion exchanger be a cation exchanger (Invention 9).

According to such an invention (Invention 9), since cations such as metal ions contained in the raw water are highly removed, the conductive aqueous solution production method is particularly suitable as a production method of cleaning water for a semiconductor wafer which requires a high-purity ammonia solution.

In the above invention (Inventions 8, 9), the raw water is preferably pure water or ultrapure water having a metal ion concentration of 10 ng/L or less (Invention 10).

According to such an invention (Invention 10), by treating the raw water by the ion exchange device and removing metal ions to a higher degree, it is possible to obtain a dilute ammonia solution with less metal ions, and it is further possible to grasp the concentration of the ammonia solution from the amount of ammonia added by the conductivity-imparting substance supply device.

In the above invention (Inventions 8 to 10), the metal ion concentration in the raw water after being in contact with the ion exchanger is preferably 10 ng/L or less (Invention 11).

According to such an invention (Invention 11), since a high-purity ammonia solution is provided, processes using the ammonia solution, such as cleaning of semiconductor wafers, can be suitably performed.

Effects of the Invention

According to the conductive aqueous solution production device of the present invention, by circulating raw water in the ion exchange device, ions in the raw water are highly removed by the ion exchange reaction, and therefore it is possible to stably obtain a high-purity conductive aqueous solution. Moreover, since the purity of the raw water is high, the follow-up performance with respect to a change in the ion concentration caused by the conductivity-imparting substance is excellent.

EMBODIMENTS FOR CARRYING OUT THE INVENTION

Figure 1:
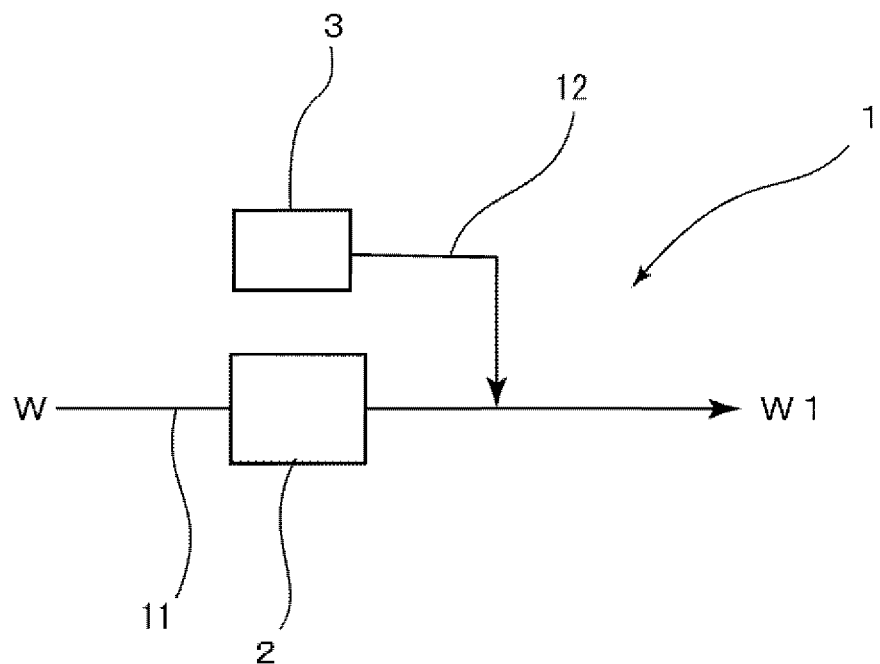
FIG. 1 is a flow chart showing a conductive aqueous solution production device of a first embodiment of the present invention.

FIG. 1 is a schematic view showing a conductive aqueous solution production device according to the first embodiment of the present invention. In FIG. 1, a conductive aqueous solution production device 1 has an ion exchange device 2 mounted on the way of a main pipe 11 supplying ultrapure water W as raw water, a supply pipe 12 joining the main pipe 11 on the downstream side of the ion exchange device 2, and a conductivity-imparting substance supply device 3 communicating with the supply pipe 12. It should be noted that although not shown in FIG. 1, various filters and valves may be appropriately provided, if necessary, in the conductive aqueous solution production device 1.

In the conductive aqueous solution production device 1 as described above, the ion exchange device 2 is filled with an ion exchange resin as an ion exchanger. As this ion exchange resin, although an anion exchange resin, cations, or a mixed resin of an anion exchange resin and cations can be used, the ion exchange resin varies depending on a conductivity-imparting substance as will be described later.

Specifically, if ions that dissolve a conductivity-imparting substance and impart conductivity to ultrapure water W are cations, it is preferable that the ion exchange device 2 be filled with a cation exchange resin, whereas if the ions that impart conductivity to ultrapure water W are anions, it is preferable that the ion exchange device 2 be filled with an anion exchange resin. For example, if the conductivity-imparting substance is ammonia, since the ions are cations, that is, ammonium ions ($NH_4^+$), it is preferable that the ion exchange device 2 be filled with a cation exchange resin. The form of ion of the cation exchange resin at this time is not particularly limited, but is preferably H form or ammonium ion form because if the ion is in salt form such as Na form, salts such as Na are contained in the conductive aqueous solution, whereby a semiconductor wafer may be contaminated. If the conductivity-imparting substance is carbon dioxide, since the ions are anions, that is, bicarbonate ions ($HCO_3^-$) or carbonate ions ($CO_3^{2-}$), it is preferable that the ion exchange device 2 be filled with an anion exchange resin. The form of ion of the anion exchange resin at this time is not particularly limited, but is preferably any one of OH form, bicarbonate ion form, or carbonate ion form because if the ion is in Cl form or the like, the conductive aqueous solution contains Cl or the like, whereby the semiconductor wafer may be contaminated. In particular, a combination of ammonia used as the conductivity-imparting substance and the ion exchange device 2 filled with a cation exchange resin is suitable.

The conductivity-imparting substance supply device 3 is for generating a conductive aqueous solution by adding a conductivity-imparting substance to raw water treated by the ion exchange device 2 (hereinafter referred to as the treated water), and the method is not particularly limited as long as the conductivity-imparting substance supply device 3 can add a conductivity-imparting substance to the treated water. For example, in the case where a gaseous conductivity-imparting substance is added to the treated water and is dissolved, it is possible to use a method in which the substance is dissolved using a gas permeable membrane made of hollow fibers, a method using direct bubbling into the pipe, or the like. In the case where an aqueous solution, which is prepared by dissolving a conductivity-imparting substance at a high concentration in pure water or ultrapure water, is added to the treated water and diluted, it is possible to use a method in which the aqueous solution stored in a tank is added using a reciprocating-type metering pump or a syringe pump, or use pressure feeding means for pressure-feeding the aqueous solution by introducing a pressurized inert gas into the tank. It should be noted that in the present embodiment, the "conductivity-imparting substance" means a substance which generates ions (anions or cations) by being dissolved in ultrapure water W that is the raw water (treated water), and imparts conductivity to the ultrapure water W by the ions. As such a conductivity-imparting substance, various substances can be used, but in the case where a conductive aqueous solution W1 to be produced is used for cleaning a semiconductor wafer, carbon dioxide and ammonia are suitable, and particularly ammonia is suitable. It is preferable to add the ammonia as ammonia water of a predetermined concentration.

The addition position of the conductivity-imparting substance by the conductivity-imparting substance supply device 3 is preferably at 5 m or less from an outlet of the ion exchange device 2. Accordingly, by arranging the separation distance from the outlet of the ion exchange device 2 to be 5 m or less, it is possible to reduce mixing of ions in the process of conveying the treated water from the ion exchange device 2 or the like, and it is possible to add the conductivity-imparting substance to the high-purity treated water.

Next, a conductive aqueous solution production method using the conductive aqueous solution production device 1 of the present embodiment having the configuration as described above will be described.

First, the ultrapure water W as raw water is brought into contact with an ion exchange resin in the ion exchange device 2. The ultrapure water W used here is water having a specific resistance value of 18 MΩ·cm or more. If ions that dissolve a conductivity-imparting substance and impart conductivity to the ultrapure water W are ammonia, the metal ion concentration in the ultrapure water W is preferably 10 ng/L or less. Accordingly, the metal ion concentration in the treated water of the ion exchange device 2 can be made an extremely low level.

In the ion exchange device 2, the cation component or the anion component is removed. Specifically, if the ions that dissolve a conductivity-imparting substance and impart conductivity to the ultrapure water W are cations, it is preferable that the ion exchange device 2 be filled with a cation exchange resin to remove the cation component. Whereas, if the ions that impart conductivity to the ultrapure water W are anions, it is preferable that the ion exchange device 2 be filled with an anion exchange resin. For example, if the conductivity-imparting substance is ammonia, it is preferable to remove the cation component, whereas if the conductivity-imparting substance is carbon dioxide, it is preferable to remove the anion component because the ions are anions, that is, bicarbonate ions ($HCO_3^-$) or carbonate ions ($CO_3^{2-}$).

In particular, if the ions that dissolve a conductivity-imparting substance and impart conductivity to the ultrapure water W are ammonia, it is preferable to arrange the metal ion concentration in the treated water, which is obtained by treatment by the ion exchange device 2 filled with the cation exchange resin, to be 10 ng/L or less. For example, if the metal ion concentration in the ultrapure water W as raw water is 10 ng/L or less, the metal ion concentration in the obtained treated water can be decreased to 1 ng/L or less, and further to an extremely low level of 0.1 ng/L or less.

Subsequently, the conductivity-imparting substance is added to the treated water of the ion exchange device 2 from the conductivity-imparting substance supply device 3 through the supply pipe 12. Here, in the present embodiment, since the treated water of the ion exchange device 2 is the ultrapure water W from which anions or cations corresponding to the conductivity-imparting substance have been removed, it is possible to stably produce a conductive aqueous solution corresponding to the addition amount of the conductivity-imparting substance. Moreover, since the treated water of the ion exchange device 2 has a high purity, there is exhibited an effect of excellent follow-up performance with respect to a change in the ion concentration caused by the conductivity-imparting substance. In short, by changing the addition amount of the conductivity-imparting substance in order to change the concentration of conductive aqueous solution W1, it is possible to rapidly change the conductive aqueous solution W1 to have a desired concentration. Furthermore, the concentration of the conductive aqueous solution can be roughly grasped from the amount of the conductivity-imparting substance added by the conductivity-imparting substance supply device 3. Hence, in order to stably supply the conductive aqueous solution of desired water quality to the use point, it is preferable to continuously monitor the concentration of the conductive aqueous solution.

In particular, it is preferable for the conductivity-imparting substance supply device 3 to use ammonia because the influence of metal ions contained in the resulting dilute ammonia water can be reduced by decreasing the metal ion concentration in the treated water to 1 ng/L or less, particularly to an extremely low level of 0.1 ng/L or less. In the case where the conductivity-imparting substance supply device 3 uses ammonia, such a conductive aqueous solution production method is suitable for the production of dilute ammonia water having an ammonia (ammonium ion) concentration of 100 mg/L or less, particularly 50 mg/L or less.

Figure 2:
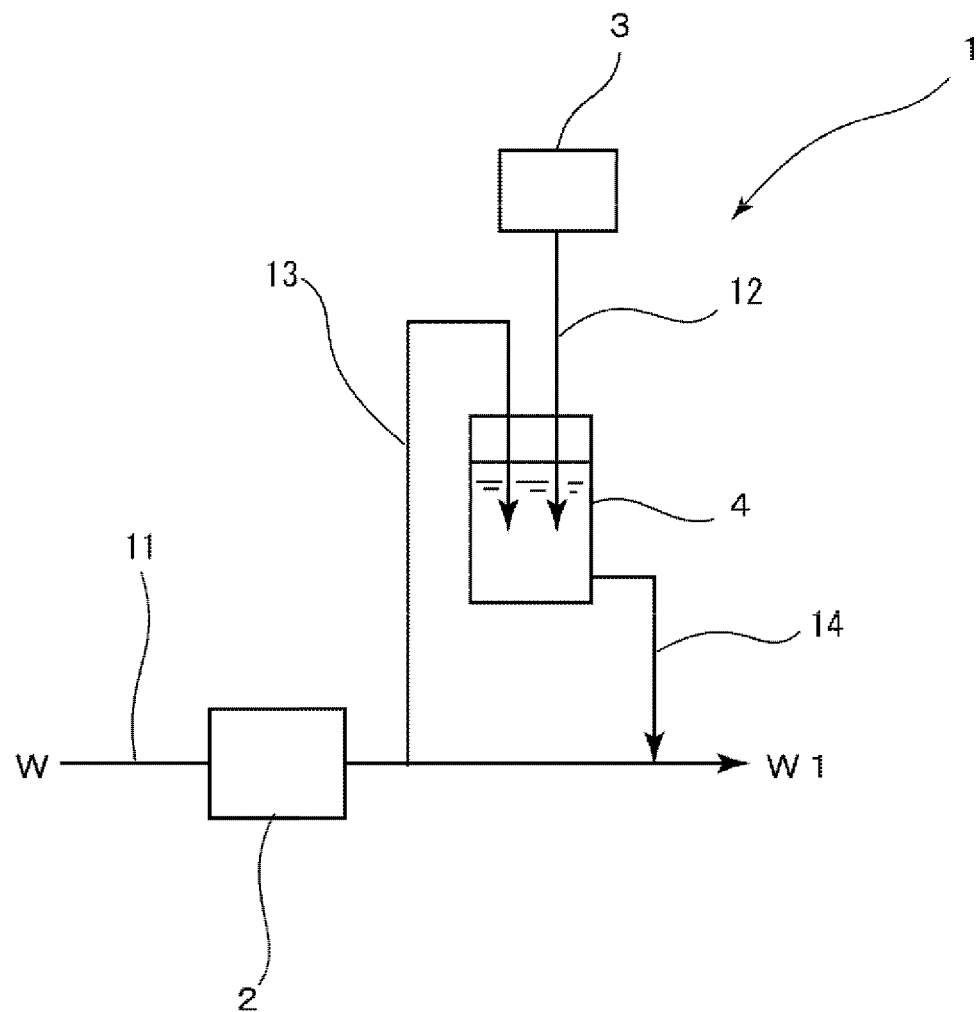
FIG. 2 is a flow chart showing a conductive aqueous solution production device of a second embodiment of the present invention.

Next, a conductive aqueous solution production device according to the second embodiment of the present invention will be described based on FIG. 2. The conductive aqueous solution production device according to the second embodiment has the same configuration as that of the above-described conductive aqueous solution production device of the first embodiment, except that this conductive aqueous solution production device includes a preliminary dilution storage tank 4 downstream of the conductivity-imparting substance supply device 3, and is configured to supply a conductivity-imparting substance to the preliminary dilution storage tank 4 and supply the treated water treated by the ion exchange device 2 to the preliminary dilution storage tank 4 through a branch pipe 13. Thus, by preparing a solution of the conductivity-imparting substance having reduced ionic impurities by preliminarily diluting the conductivity-imparting substance with the treated water treated by the ion exchange device 2, and thereafter by dissolving the conductivity-imparting substance in the treated water of the ion exchange device 2, the conductive aqueous solution W1 can be produced.

Figure 3:
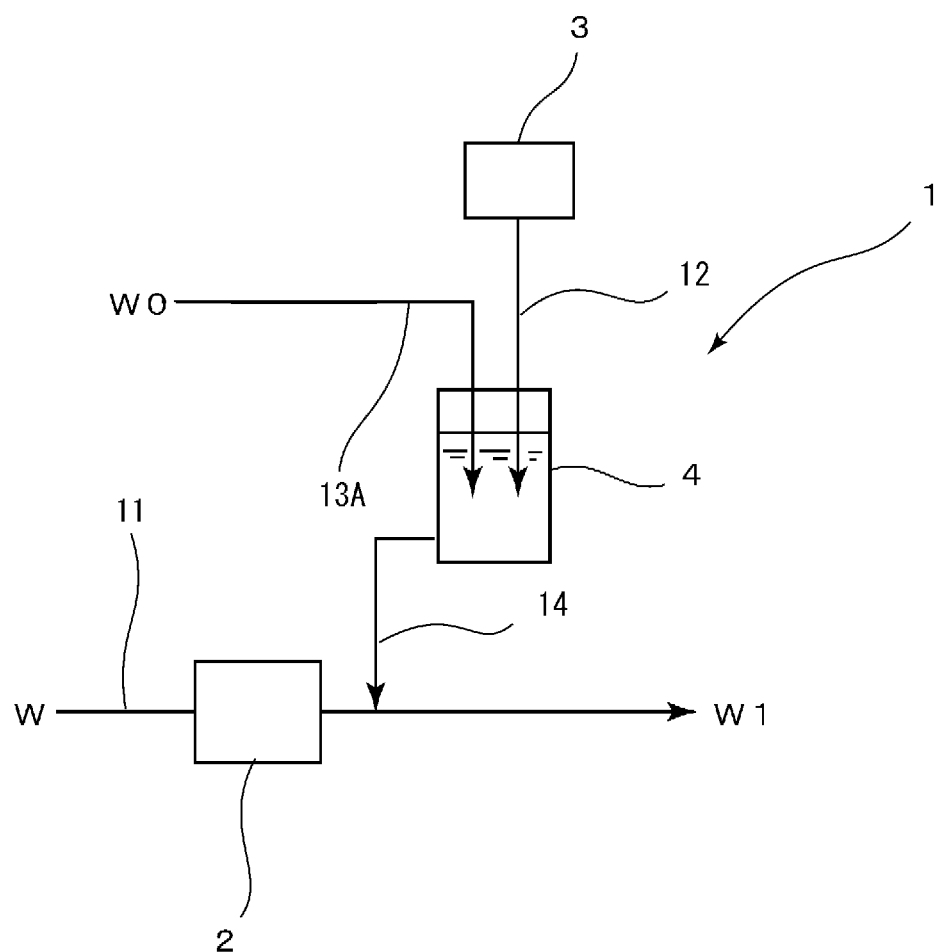
FIG. 3 is a flow chart showing a conductive aqueous solution production device of a third embodiment of the present invention.

A conductive aqueous solution production device according to the third embodiment of the present invention will be described based on FIG. 3. This conductive aqueous solution production device 1 has the same configuration as that of the above-described conductive aqueous solution production device of the second embodiment, except that the conductive aqueous solution production device 1 is configured to supply ultrapure water W0 to the preliminary dilution storage tank 4 of the conductivity-imparting substance, instead of supplying the treated water treated by the ion exchange device 2, in order to dilute the conductivity-imparting substance. Thus, by preparing a solution of the conductivity-imparting substance having reduced ionic impurities by preliminarily diluting the conductivity-imparting substance with the ultrapure water W0 having similar water quality to that of the treated water treated by the ion exchange device 2, and thereafter by dissolving the conductivity-imparting substance in the treated water of the ion exchange device 2, the conductive aqueous solution W1 can be produced.

Although the conductive aqueous solution production device and the conductive aqueous solution production method of the present invention have been described above based on the above embodiments, the present invention is not limited to the above embodiments, and various modifications can be made. For example, the conductivity-imparting substance supply device 3 and the preliminary dilution storage tank 4 may be provided with a purge function of an inert gas such as nitrogen gas. Furthermore, the addition amount of the conductivity-imparting substance may be controlled by providing the conductivity-imparting substance supply device 3 and the preliminary dilution storage tank 4 with a concentration sensor for ions that impart conductivity, and also by providing a concentration sensor at a stage later than the conductivity-imparting substance supply point on the main pipe 11. It should be noted that in the above-described embodiments, the cases where the ultrapure water W is used are described, but the present invention can also be applied in the same manner to pure water having a lower purity.

EXAMPLES

The present invention will be more specifically described by presenting Examples and Comparative Examples below. However, the present invention is not limited in any way by these descriptions.

Example 1

Figure 4:
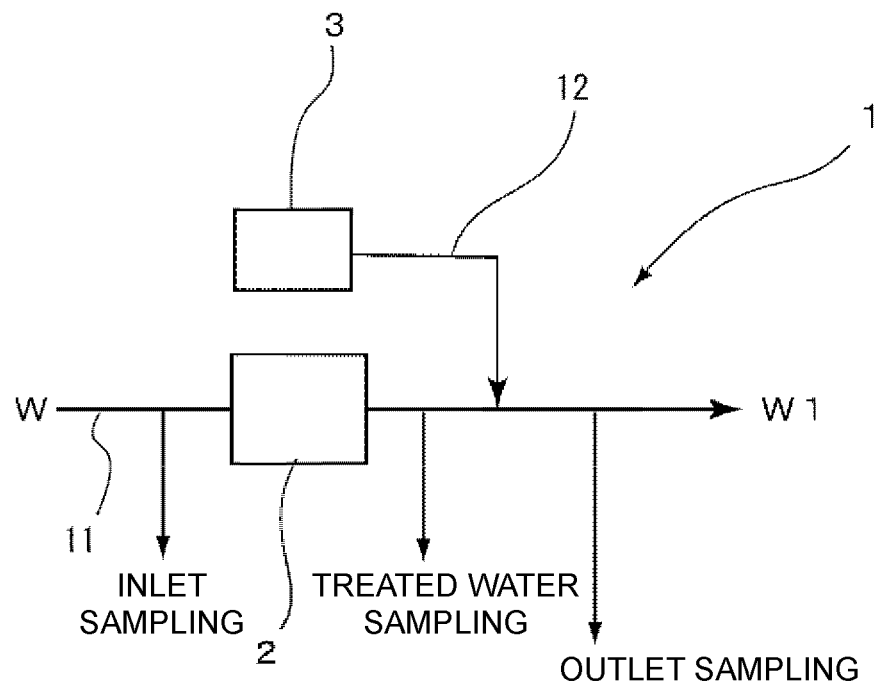
FIG. 4 is a flow chart showing a conductive aqueous solution production device of Examples 1 to 4.

Using the conductive aqueous solution production device 1 shown in FIG. 4, dilute ammonia water was produced as the conductive aqueous solution W1. Here, the conductive aqueous solution production device 1 shown in FIG. 4 is the conductive aqueous solution production device shown in FIG. 1, wherein the conductivity-imparting substance supply device 3 supplies ammonia water as a conductivity-imparting substance, the ion exchange device 2 is filled with a cation exchange resin as an ion exchanger, and further, for testing, an inlet sampling point and a treated water sampling point are provided upstream and downstream of the ion exchange device 2, and an outlet sampling point is provided downstream of an ammonia water addition point.

In such a conductive aqueous solution production device, after ultrapure water W having a metal ion concentration of 10 ng/L was treated by the ion exchange device 2, initial setting was made so that the ammonia concentration was 35 mg/L, and ammonia was introduced from the conductivity-imparting substance supply device 3 to produce an initial ammonia solution. When the concentration of the initial ammonia water became stable, the initial ammonia solution was sampled at the outlet sampling point, and the ammonia concentration and the metal concentration were measured. As a result, the ammonia concentration was 35 mg/L, and the metal ion concentration was 10 ng/L.

Thereafter, the setting was changed so that the ammonia concentration was 10 mg/L and accordingly the amount of ammonia introduced from the conductivity-imparting substance supply device 3 was changed, and the dilute ammonia water W1 was produced. One minute after the setting change, the outlet water was sampled, and the ammonia concentration and the metal concentration were measured. The ammonia concentration was 10 mg/L, and the metal ion concentration was less than 0.1 ng/L. These results are shown in Table 1 together with the metal ion concentration in the inlet water (ultrapure water W) and that in the treated water of the ion exchange device 2.

Example 2

The dilute ammonia water W1 was produced in the same manner as in Example 1, except that the setting was changed so that the ammonia concentration was 0.1 mg/L, and accordingly the amount of ammonia introduced from the conductivity-imparting substance supply device 3 was changed. Then, one minute after the setting change, the ammonia solution was collected at the outlet sampling point, and the ammonia concentration and the metal concentration were measured. The ammonia concentration was 0.1 mg/L, and the metal ion concentration was less than 0.1 ng/L. These results are shown in Table 1 together with the metal ion concentration in the inlet water (ultrapure water W) and that in the treated water of the ion exchange device 2.

Example 3

In Example 1, after treating the ultrapure water W having a metal ion concentration of 100 ng/L as raw water by the ion exchange device 2, the initial setting was made so that the ammonia concentration was 35 mg/L, and ammonia was introduced from the conductivity-imparting substance supply device 3 to produce the initial ammonia water. When the concentration of the initial ammonia water became stable, the initial ammonia solution was sampled at the outlet sampling point, and the ammonia concentration and the metal concentration were measured. As a result, the ammonia concentration was 35 mg/L, and the metal ion concentration was 100 ng/L.

Thereafter, the setting was changed so that the ammonia concentration was 1 mg/L and accordingly the amount of ammonia introduced from the conductivity-imparting substance supply device 3 was changed, and the dilute ammonia water W1 was produced. One minute after the setting change, the ammonia solution was collected at the outlet sampling point, and the ammonia concentration and the metal concentration were measured. The ammonia concentration was 1 mg/L, and the metal ion concentration was 10 ng/L. These results are shown in Table 1 together with the metal ion concentration in the inlet water (ultrapure water W) and that in the treated water of the ion exchange device 2.

Example 4

In Example 1, after treating the ultrapure water W having a metal ion concentration of 10 ng/L as raw water by the ion exchange device 2, the initial setting was made so that the ammonia concentration was 0.1 mg/L, and ammonia was introduced from the conductivity-imparting substance supply device 3 to produce the initial ammonia water. When the concentration of the initial ammonia water became stable, the initial ammonia solution was sampled at the outlet sampling point, and the ammonia concentration and the metal concentration were measured. As a result, the ammonia concentration was 0.1 mg/L, and the metal ion concentration was less than 0.1 ng/L.

Thereafter, the setting was changed so that the ammonia concentration was 35 mg/L and accordingly the amount of ammonia introduced from the conductivity-imparting substance supply device 3 was changed, and the dilute ammonia water W1 was produced. One minute after the setting change, the ammonia solution was collected at the outlet sampling point, and the ammonia concentration and the metal concentration were measured. The ammonia concentration was 35 mg/L, and the metal ion concentration was less than 0.1 ng/L. These results are shown in Table 1 together with the metal ion concentration in the treated water of the ion exchange device 2.

Example 5

Figure 5:
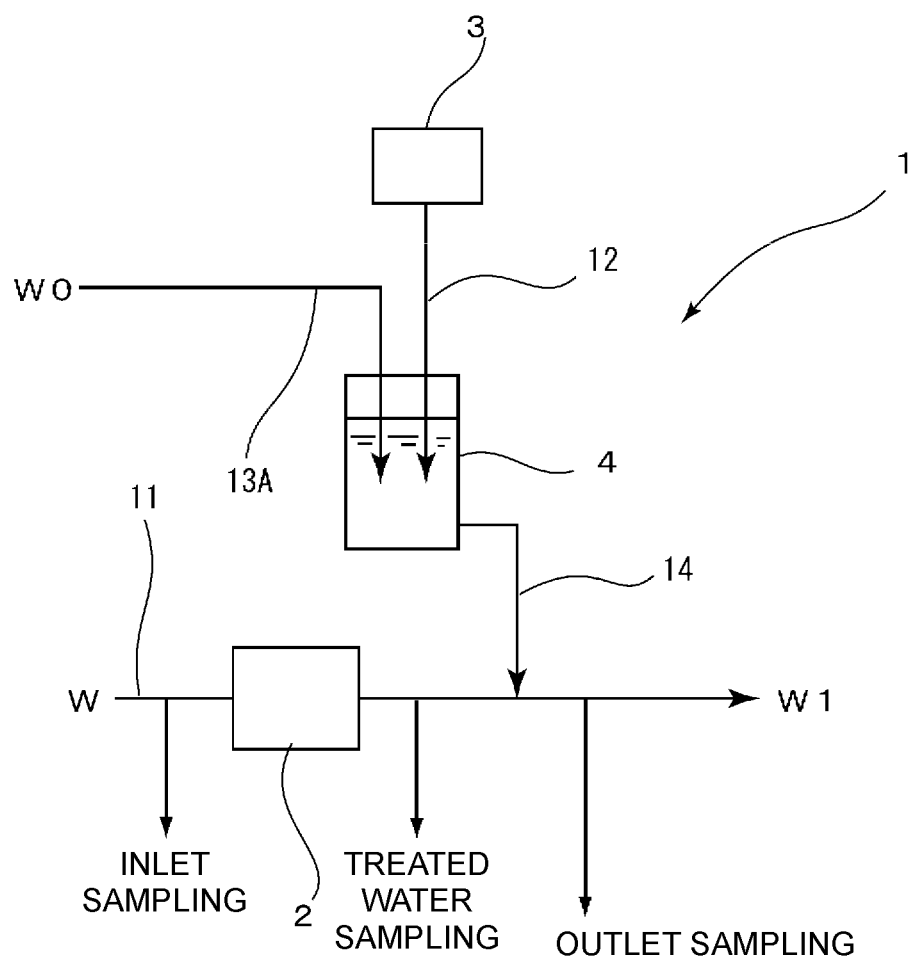
FIG. 5 is a flow chart showing a conductive aqueous solution production device of Examples 5 to 7.

The dilute ammonia water W1 was produced using the conductive aqueous solution production device 1 shown in FIG. 5. Here, the conductive aqueous solution production device 1 shown in FIG. 5 is the conductive aqueous solution production device shown in FIG. 3, wherein the conductivity-imparting substance supply device 3 is configured such that ammonia water as a conductivity-imparting substance is supplied to the preliminary dilution storage tank 4, and the preliminary dilution storage tank 4 is supplied with the ultrapure water W0 having a metal ion concentration of less than 0.1 ng/L to dilute the ammonia water, and the ion exchange device 2 is filled with a cation exchange resin. Moreover, for testing, an inlet sampling point and a treated water sampling point are provided upstream and downstream of the ion exchange device 2, and an outlet sampling point is provided downstream of the ammonia addition point.

In such a conductive aqueous solution production device, after the ultrapure water W having a metal ion concentration of 10 ng/L was treated by the ion exchange device 2, initial setting was made so that the ammonia concentration was 35 mg/L, and an ammonia solution was introduced from the preliminary dilution storage tank 4 to produce the initial ammonia water. When the concentration of the initial ammonia water became stable, the initial ammonia solution was sampled at the outlet sampling point, and the ammonia concentration and the metal concentration were measured. As a result, the ammonia concentration was 35 mg/L, and the metal ion concentration was less than 0.1 ng/L.

Thereafter, the setting was changed so that the ammonia concentration was 10 mg/L and accordingly the amount of the ammonia solution introduced from the preliminary dilution storage tank 4 was changed, and the dilute ammonia water W1 was produced. One minute after the setting change, the ammonia solution was collected at the outlet sampling point, and the ammonia concentration and the metal concentration were measured. The ammonia concentration was 10 mg/L, and the metal ion concentration was less than 0.1 ng/L. These results are shown in Table 1 together with the metal ion concentration in the inlet water (ultrapure water W) and that in the treated water of the ion exchange device 2.

Example 6

The dilute ammonia water W1 was produced in the same manner as in Example 5, except that the setting was changed so that the ammonia concentration was 0.1 mg/L, and the amount of the ammonia solution introduced from the preliminary dilution storage tank 4 was changed. Then, one minute after the setting change, the ammonia solution was collected at the outlet sampling point, and the ammonia concentration and the metal concentration were measured. The ammonia concentration was 0.1 mg/L, and the metal ion concentration was less than 0.1 ng/L. These results are shown in Table 1 together with the metal ion concentration in the inlet water (ultrapure water W) and that in the treated water of the ion exchange device 2.

Example 7

In Example 5, after treating the ultrapure water W having a metal ion concentration of 10 ng/L as raw water by the ion exchange device 2, initial setting was made so that the ammonia concentration was 0.1 mg/L, and ammonia was introduced from the conductivity-imparting substance supply device 3 to produce the initial ammonia water. When the concentration of the initial ammonia water became stable, the initial ammonia solution was sampled at the outlet sampling point, and the ammonia concentration and the metal concentration were measured. As a result, the ammonia concentration was 0.1 mg/L, and the metal ion concentration was less than 0.1 ng/L.

Thereafter, the setting was changed so that the ammonia concentration was 35 mg/L and accordingly the amount of ammonia introduced from the conductivity-imparting substance supply device 3 was changed, and the dilute ammonia water W1 was produced. One minute after the setting change, the outlet water was sampled, and the ammonia concentration and the metal concentration were measured. The ammonia concentration was 35 mg/L, and the metal ion concentration was less than 0.1 ng/L. These results are shown in Table 1 together with the metal ion concentration in the inlet water (ultrapure water W) and that in the treated water of the ion exchange device 2.

Comparative Example 1

Figure 6:
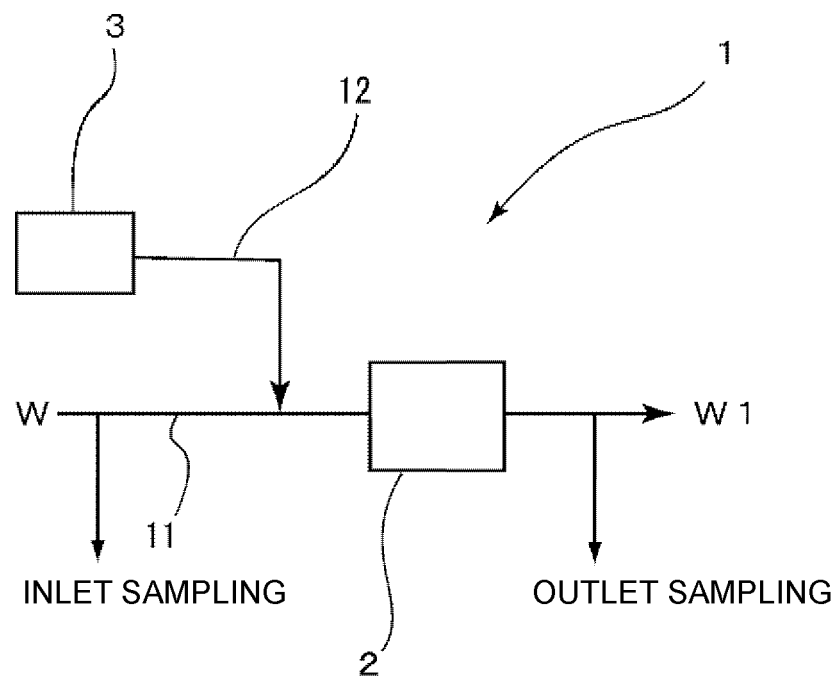
FIG. 6 is a flow chart showing a conductive aqueous solution production device of Comparative Examples 1 to 5.

The dilute ammonia water W1 was produced using the conductive aqueous solution production device 1 shown in FIG. 6. Here, the conductive aqueous solution production device 1 shown in FIG. 6 is configured to supply ammonia water from the conductivity-imparting substance supply device 3 to the ultrapure water W and thereafter treat the water by the ion exchange device 2 filled with a cation exchange resin, and further, for testing, an inlet sampling point is provided upstream of the ammonia addition point, and an outlet sampling point is provided downstream of the ion exchange device 2.

In such a conductive aqueous solution production device, initial setting was made so that the ammonia concentration was 35 mg/L, and ammonia was introduced from the conductivity-imparting substance supply device 3 into the ultrapure water W having a metal ion concentration of 10 ng/L, and thereafter the water was treated by the ion exchange device 2 to produce the initial ammonia water. When the concentration of the initial ammonia water became stable, the initial ammonia solution was sampled at the outlet sampling point, and the ammonia concentration and the metal concentration were measured. As a result, the ammonia concentration was 35 mg/L, and the metal ion concentration was 10 ng/L.

Thereafter, the setting was changed so that the ammonia concentration was 10 mg/L and accordingly the amount of ammonia introduced from the conductivity-imparting substance supply device 3 was changed, and the dilute ammonia water W1 was produced. One minute after the setting change, the outlet water was sampled, and the ammonia concentration and the metal concentration were measured. The ammonia concentration was 15 mg/L, and the metal ion concentration was 3 ng/L. These results are shown in Table 1 together with the metal ion concentration in the inlet water (ultrapure water W).

Comparative Example 2

The dilute ammonia water W1 was produced in the same manner as in Comparative Example 1, except that the setting was changed so that the ammonia concentration was 25 mg/L, and the amount of the ammonia solution introduced from the conductivity-imparting substance supply device 3 was changed. One minute after the setting change, the outlet water was sampled, and the ammonia concentration and the metal concentration were measured. The ammonia concentration was 29 mg/L, and the metal ion concentration was 4 ng/L. These results are shown in Table 1 together with the metal ion concentration in the inlet water (ultrapure water W).

Comparative Example 3

The dilute ammonia water W1 was produced in the same manner as in Comparative Example 1, except that the setting was changed so that the ammonia concentration was 0.1 mg/L, and the amount of the ammonia solution introduced from the conductivity-imparting substance supply device 3 was changed. One minute after the setting change, the outlet water was sampled, and the ammonia concentration and the metal concentration were measured. The ammonia concentration was 10 mg/L, and the metal ion concentration was 2 ng/L. These results are shown in Table 1 together with the metal ion concentration in the inlet water (ultrapure water W).

Comparative Example 4

In Comparative Example 1, initial setting was made so that the ammonia concentration was 0.1 mg/L, and ammonia was introduced from the conductivity-imparting substance supply device 3 into the ultrapure water W having a metal ion concentration of 10 ng/L, and thereafter the water was treated by the ion exchange device 2 to produce the initial ammonia water. When the concentration of this initial ammonia water became stable, the initial ammonia solution was sampled at the outlet sampling point, and the ammonia concentration and the metal concentration were measured. As a result, the ammonia concentration was 0.1 mg/L, and the metal ion concentration was 10 ng/L.

Thereafter, the setting was changed so that the ammonia concentration was 35 mg/L and accordingly the amount of ammonia introduced from the conductivity-imparting substance supply device 3 was changed, and the dilute ammonia water W1 was produced. One minute after the setting change, the outlet water was sampled, and the ammonia concentration and the metal concentration were measured. The ammonia concentration was 29 mg/L, and the metal ion concentration was 4 ng/L. These results are shown in Table 1 together with the metal ion concentration in the inlet water (ultrapure water W).

Comparative Example 5

In Comparative Example 1, initial setting was made so that the ammonia concentration was 35 mg/L, and ammonia was introduced from the conductivity-imparting substance supply device 3 into the ultrapure water W having a metal ion concentration of 100 ng/L, and thereafter the water was treated by the ion exchange device 2 to produce the initial ammonia water. When the concentration of the initial ammonia water became stable, the initial ammonia solution was sampled at the outlet sampling point, and the ammonia concentration and the metal concentration were measured. As a result, the ammonia concentration was 35 mg/L, and the metal ion concentration was 10 ng/L.

Thereafter, the setting was changed so that the ammonia concentration was 10 mg/L and accordingly the amount of ammonia introduced from the conductivity-imparting substance supply device 3 was changed, and the dilute ammonia water W1 was produced. One minute after the setting change, the outlet water was sampled, and the ammonia concentration and the metal concentration were measured. The ammonia concentration was 14 mg/L, and the metal ion concentration was 27 ng/L. These results are shown in Table 1 together with the metal ion concentration in the inlet water (ultrapure water W).

As is apparent from Table 1, in the conductive aqueous solution production devices of Examples 1 to 7 in which the ammonia water was added after the ultrapure water W was treated with the cation exchange resin, the rate of deviation between the set value of ammonia concentration and the ammonia concentration one minute after the setting change of the ammonia concentration was small, and the metal ion concentration in the resulting dilute ammonia water W1 was also small. On the other hand, in the conductive aqueous solution production devices of Comparative Examples 1 to 5 in which, after ammonia was added to the ultrapure water W, the water was treated with the cation exchange resin, the follow-up performance of the ammonia concentration one minute after the setting change of the ammonia concentration was poor, and the metal ion concentration in the resulting dilute ammonia water W1 was large due to the influence of the concentration of the ammonia water.

DESCRIPTION OF REFERENCE SYMBOLS

1 Conductive aqueous solution production device
2 Ion exchange device
3 Conductivity-imparting substance supply device
4 Preliminary dilution storage tank
W Ultrapure water (raw water)
W1 Conductive aqueous solution (dilute ammonia water)
W0 Ultrapure water (dilution water)

The invention claimed is:
1. A conductive aqueous solution production device comprising:
   a main pipe;
   an ion exchange device provided in the main pipe and configured to circulate raw water;
   a branch pipe that branches from the main pipe at a branch point downstream of the ion exchange device;
   a supply pipe that merges into the main pipe at a junction point downstream of the ion exchange device and downstream of the branch point;
   a preliminary dilution storage tank that communicates with the branch pipe and the supply pipe and for being

TABLE 1

| | Inlet water | Treated water | Dilute ammonia solution (outlet water) | | | |
| --- | --- | --- | --- | --- | --- | --- |
| | | | Initial value | Set value | 1 min. after setting | |
| Example No. | Metal ions [ng/L] | Metal ions [ng/L] | Ammonia concentration [mg/L] | Ammonia concentration [mg/L] | Ammonia concentration [mg/L] | Metal ions [ng/L] |
| Example 1 | 10 | <0.1 | 35 | 10 | 10 | <0.1 |
| Example 2 | 10 | <0.1 | 35 | 0.1 | 0.1 | <0.1 |
| Example 3 | 100 | 1 | 35 | 1 | 1 | 1 |
| Example 4 | 10 | <0.1 | 0.1 | 35 | 35 | <0.1 |
| Example 5 | 10 | <0.1 | 35 | 10 | 10 | <0.1 |
| Example 6 | 10 | <0.1 | 35 | 0.1 | 0.1 | <0.1 |
| Example 7 | 10 | <0.1 | 0.1 | 35 | 35 | <0.1 |
| Comparative Example 1 | 10 | — | 35 | 10 | 15 | 3 |
| Comparative Example 2 | 10 | — | 35 | 25 | 29 | 4 |
| Comparative Example 3 | 10 | — | 35 | 0.1 | 10 | 2 |
| Comparative Example 4 | 10 | — | 0.1 | 35 | 29 | 4 |
| Comparative Example 5 | 100 | — | 35 | 10 | 14 | 27 | supplied with a part of a treated water which has passed through the ion exchange device; and a conductivity-imparting substance supply device configured to add a conductivity-imparting substance to the treated water in the preliminary dilution storage tank, wherein the conductivity-imparting substance is ammonia, wherein ions, which are generated by dissolving the ammonia in the part of the treated water and impart conductivity to the part of the treated water, are cations, wherein the ion exchange device is filled with a cation exchanger, wherein a separation distance between an outlet of the ion exchange device and the junction point in the main pipe is 5 m or less, wherein the raw water to be supplied to the ion exchange device is pure water or ultrapure water having a metal ion concentration of 10 ng/L or less, and wherein the metal ion concentration in a conductive aqueous solution that flows through the main pipe downstream of the junction point is 1 ng/L or less.

\* \* \* \* \*